Feb. 9, 1954

K. M. HAMMELL 2,668,420

COMBINATION WATER HEATING AND ROOM COOLING
SYSTEM AND METHOD EMPLOYING HEAT PUMPS

Filed March 20, 1951

INVENTOR.
Kemper M. Hammell
BY
Smith, Olsen + Baird
Attys.

Feb. 9, 1954 K. M. HAMMELL 2,668,420
COMBINATION WATER HEATING AND ROOM COOLING
SYSTEM AND METHOD EMPLOYING HEAT PUMPS
Filed March 20, 1951 3 Sheets-Sheet 3

FIG. 6

INVENTOR.
Kemper M. Hammell
BY
Smith, Olsen & Baird
Attys.

Patented Feb. 9, 1954

2,668,420

UNITED STATES PATENT OFFICE 2,668,420

COMBINATION WATER HEATING AND ROOM COOLING SYSTEM AND METHOD EMPLOYING HEAT PUMPS

Kemper M. Hammell, Harrisburg, Pa., assignor to General Electric Company, a corporation of New York Application March 20, 1951, Serial No. 216,626

27 Claims. (Cl. 62—4)

The present invention relates to heat pumps and more particularly to systems for and methods of water heating and room cooling employing heat pumps incorporating a refrigeration cycle of the compression-liquefaction-expansion type.

It is the general object of the present invention to provide improved and simplified heat pump systems and methods.

Another object of the invention is to provide an improved system for and method of water heating that is especially adapted for home and other small installations.

Another object of the invention is to provide an improved system for and method of room cooling that is especially adapted for home and other small installations.

Another object of the invention is to provide an improved combined system for and method of water heating and room cooling that is especially adapted for home and other small installations.

A further object of the invention is to provide an improved water heater that may be readily connected and disconnected with respect to a hot water storage tank so that the heater may be readily incorporated in an existing hot water system and so that the heater may be readily disassociated from the hot water storage tank in the system in order to facilitate adjustment or repair thereof.

A further object of the invention is to provide an improved refrigerating machine of the heat pump type that is efficient in operation and compact in structure rendering the machine admirably suited to combination water heating and room cooling in a home or other small installation.

A still further object of the invention is to provide an improved control network for a combination water heating and room cooling system of the heat pump type so that the system may be readily set primarily for heating water or primarily for both heating water and cooling a room.

Further features of the invention pertain to the particular arrangement of the elements of the system and of the steps of the method, whereby the above-outlined and additional operating features thereof are attained.

The invention, both as to its organization and method of operation, together with further objects and advantages thereof, will best be understood by reference to the following specification, taken in connection with the accompanying drawings, in which.

Referring now to Figs. 1 to 4, inclusive, of the drawings, the combination water heater and room cooler 10 there illustrated, and embodying the features of the present invention, is of the heat pump type and comprises two upstanding separable elements 11 and 12 normally arranged in assembled relation. The element 11 is arranged to store hot water and consists essentially of a substantially annular base 13 provided with feet 14 adapted to engage the floor or other supporting surface, an upstanding cylindrical tank 15 carried by the base 13, and an upstanding substantially cylindrical casing 16 carried by the base 13 and enclosing the tank 15. Insulating material 17, glass wool, or the like, is arranged within the casing 16 and in surrounding relation with respect to the side and top walls of the tank 15, the insulating material 17 being preferably in the form of bats or blankets to facilitate placement and removal thereof with respect to the tank 15. As illustrated, the casing 16 may comprise a substantially annular bottom wall 18, a substantially cylindrical side wall 19 and a substantially annular top wall 20, the bottom wall 18 and the side wall 19 being removable with respect to each other and the top wall 20 and the side wall 19 being removable with respect to each other to facilitate assembly and disassembly of the casing 16.

Figure 4:
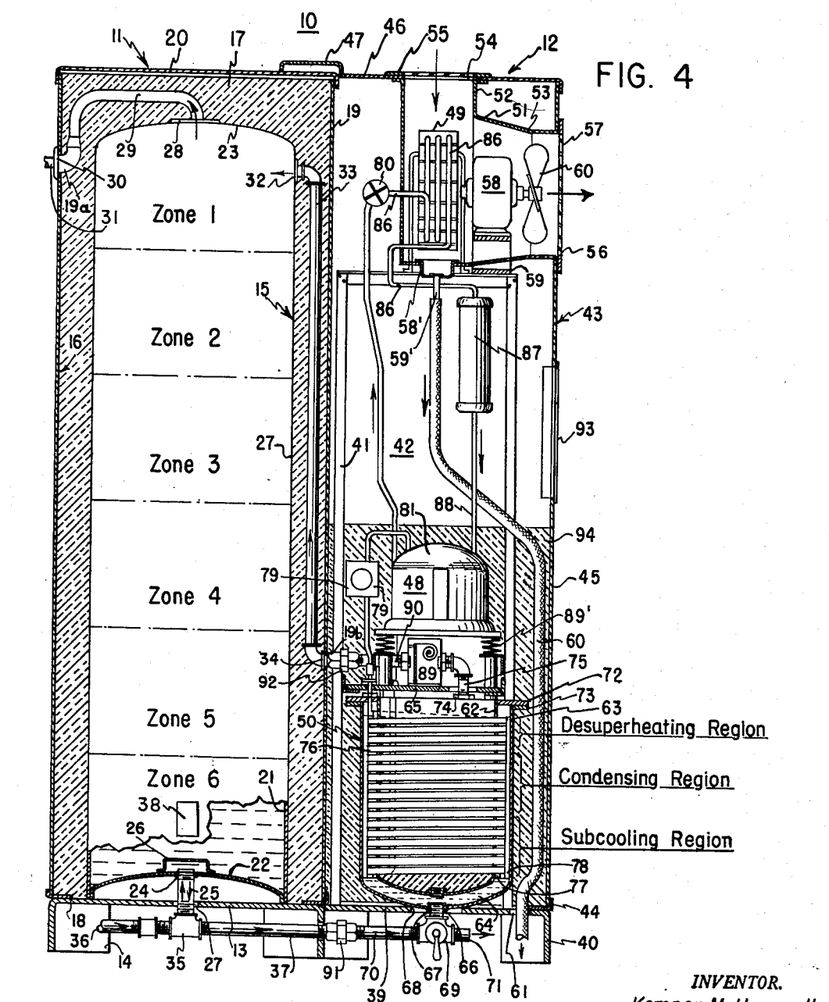
Fig. 4 is an enlarged side elevational view of the heater-cooler, similar to Fig. 2, partly broken away and partly in section, illustrating the arrangement of the various elements incorporated therein.

The tank 15 may comprise a substantially cylindrical side wall 21, a substantially annular concave bottom wall 22, and a substantially annular convex top wall 23, and is normally formed of steel that has been provided with exterior and interior galvanized coatings. A substantially centrally disposed spud 24 is provided in the bottom wall 22 and is threaded to receive a cold water inlet conduit 25, a deflector 26 being secured to the interior surface of the bottom wall 22 over the open end of the cold water inlet conduit 25 for the purpose of spreading out and distributing the cold water admitted into the lower portion of the tank 15 so as to prevent mixing of the incoming cold water and the hot water normally stored in the tank 15, whereby stratification of the hot water normally stored in the tank 15 is preserved. The lower end of the cold water conduit 25 extends through an opening 27 provided in the base 13 so that it may be connected into the associated plumbing in a manner more fully explained hereinafter. A substantially centrally disposed spud 28 is provided in the top wall 23 and is threaded to receive the inner end of a heat trap conduit 29, the outer end of the heat trap conduit 29 projecting through an opening 19a provided in the upper portion of the side wall 19 and carrying a fitting 30 that is connected to hot water plumbing 31. A spud 32 is arranged in the upper portion of the side wall 21 and is threaded to receive the upper end of a circulation conduit 33 arranged between the side walls 21 and 19, the lower end of the circulation conduit 33 projecting through an opening 19b provided in the lower portion of the side wall 19 and carrying a fitting 34 that is employed for a purpose more fully explained hereinafter. A T fixture 35 is secured to the lower end of the cold water inlet conduit 25 below the base 13 and is connected commonly to cold water supply plumbing 36 and to a laterally extending circulation conduit 37. Finally a thermostatic switch 38 is carried by the lower portion of the tank 15 for a purpose more fully explained hereinafter.

Figure 1:
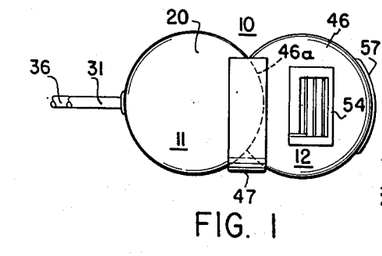
Figure 1 is a plan view of a combination water heater and room cooler of the heat pump type embodying the present invention.
Figure 2:
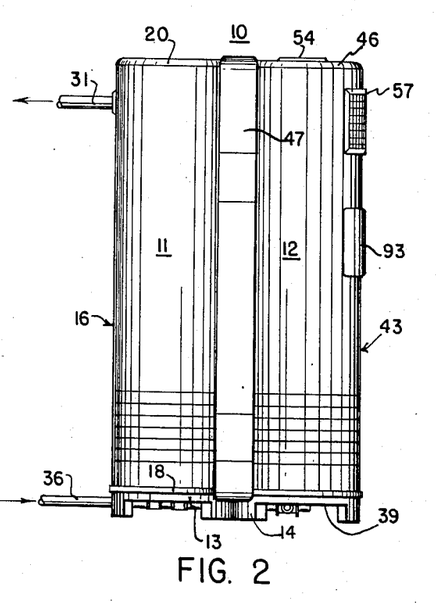
Fig. 2 is a side elevational view of the heater-cooler shown in Fig. 1.
Figure 3:
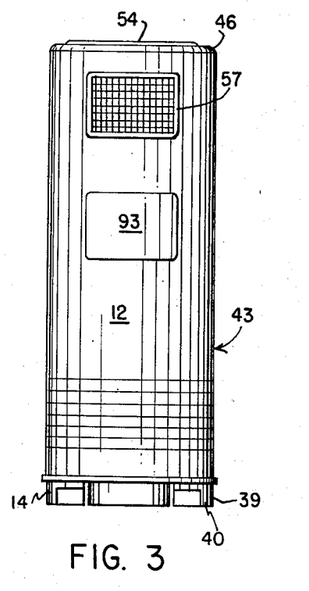
Fig. 3 is an end elevational view of the heater-cooler shown in Figs. 1 and 2.

The element 12 is arranged to heat water and to cool room air and consists essentially of a substantially annular base 39 provided with feet 40 adapted to engage the floor or other supporting surface, an upstanding frame 41 carried by the base 39, a refrigerating machine 42 carried by the frame 41, and an upstanding substantially cylindrical casing 43 carried by the base 39 and enclosing the frame 41 and the refrigerating machine 42. As illustrated, the casing 43 may comprise a substantially annular bottom wall 44, a substantially cylindrical side wall 45 and a substantially annular top wall 46, the bottom wall 44 and the side wall 45 being removable with respect to each other and the top wall 46 and the side wall 45 being removable with respect to each other to facilitate assembly and disassembly of the casing 43. More particularly in the element 12, the parts of the base 39, the bottom wall 44, the side wall 45 and the top wall 46 that are normally assembled adjacent to the corresponding parts of the element 11 are provided with cutouts or recesses so that they may receive the corresponding parts of the element 11. For example, as illustrated in Fig. 1, the top wall 46 is provided with a cutout or recess 46a that receives the corresponding part of the top wall 20. This arrangement is very advantageous as it prevents tangential contact between the elements 11 and 12 and contributes materially to compactness of the heater-cooler 10. The junction between the elements 11 and 12 is covered by a substantially L-shaped trim member 47 to provide a finished appearance to the heater-cooler 10, the trim member 47 being removably secured in any suitable manner to the adjacent portions of the casings 16 and 43.

The refrigerating machine 42 is of the compression-liquefaction-expansion type including a motor-compressor unit 48 of the sealed casing variety, an evaporator 49 and a condenser-heat exchanger 50. The evaporator 49 is arranged adjacent to the upper central portion of the casing 43 and is suitably supported upon the top of the frame 41. Also a substantially L-shaped air duct 51 is arranged in the upper portion of the casing 43 and housing the evaporator 49, the duct 51 being provided with an upwardly directed leg 52 and a laterally directed leg 53. The upwardly directed leg 52 communicates with an opening 54 provided in the top wall 46, the top wall 46 also removably carrying a substantially rectangular louver member 55 covering the opening 54; and the laterally directed leg 53 communicates with an opening 56 provided in the upper portion of the side wall 45, the upper portion of the side wall 45 also removably carrying a substantially semi-cylindrical wire screen 57 covering the opening 56. Also arranged within the laterally directed leg 53 is an electric motor 58 that is supported upon a base 59 carried by the top of the frame 41, the motor 58 being provided with an operating shaft that carries a fan 60 disposed within the laterally directed leg 53 adjacent to the wire screen 57. The motor 58 is arranged so that when it is operated, the fan 60 is rotated so as to circulate air through the duct 51, the air being drawn through the louver member 55 and being discharged through the wire screen 57. The air thus circulated through the duct 51 is passed through the evaporator 49 in good heat exchange relation therewith and thence over the motor 58, whereby the air circulated through the duct 51 is substantially cooled.

A drip tray or pan 58' is removably secured in place in the lower portion of the duct 51 below the evaporator 49 for the purpose of receiving water that is condensed out of the air that is circulated through the duct 51 into heat exchange with the evaporator 49 resulting from cooling of the air below its dew point. Of course the moisture accumulates upon the evaporator 49 and drips into the tray 58'. The water dripping into the drip tray 58' is conducted therefrom through a downwardly directed drain conduit 59' that communicates with a flexible drain hose 60. More particularly the upper end of the drain hose 60 is suitably secured to the drain conduit 59'; and the lower end of the drain hose 60 extends through an opening 61 provided in the base 39 and communicates with drain plumbing, not shown.

Preferably the heat exchanger 50 is of the construction and arrangement of that disclosed in the copending application of Kemper M. Hammell, Serial No. 191,010, filed October 19, 1950 and comprises a vessel formed by inner and outer substantially cup-shaped walls 62 and 63 arranged in nested relation and defining a substantially cup-shaped chamber 64 therebetween. The heat exchanger 50 is arranged in upstanding position in the lower portion of the casing 43 immediately above the base 39 and is carried by the frame 41 upon an arrangement including a substantially horizontally extending supporting plate 65. A substantially centrally disposed spud 66 is carried by the closed bottom end of the outer wall 63 and threaded to receive an upwardly projecting fixture 67 that extends through a centrally disposed opening 68 formed in the base 39. The lower end of the fixture 67 carries a three-position manual control valve 69 that is connected both to a circulation conduit 70 and to a drain conduit 71. The upper portions of the inner and outer walls 62 and 63 respectively carry substantially annular flanges 72 and 73 that are removably secured together by bolts, not shown, and a fixture 74 is carried by the flange 72 and threaded to receive an upwardly directed circulation conduit 75. In view of the foregoing, it will be understood that water passing through the fixture 67 enters the lower portion of the chamber 64, rises therein, and leaves the upper portion of the chamber 64 through the circulation conduit 75. Also the heat exchanger comprises a substantially helical refrigerant conduit 76 that is arranged within the chamber 64 and supported in place by inner and outer substantially cylindrical corrugated structures 77 and 78. The structures 77 and 78 are arranged in good heat exchange relation with the convolutions of the refrigerant conduit 76 and in poor heat exchange relation with the respective inner and outer walls 62 and 63, whereby heat from the refrigerant conduit 76 is readily transmitted to the structures 77 and 78, but heat transfer from the structures 77 and 78 to the respective inner and outer walls 62 and 63 is retarded. Also the flutes provided in the structures 77 and 78 accommodate the ready passage of the water in the chamber 64 upwardly therethrough and in good heat exchange relation with the convolutions of the refrigerant conduit 76. The upper end of the refrigerant conduit 76 projects upwardly through a sealed opening provided in the flange 72 and is connected to the casing of a high pressure controller 79; while the lower end of the refrigerant conduit 76 projects inwardly through a sealed opening provided in the lower portion of the inner wall 62 and then extends upwardly through the hollow cavity provided in the inner wall 62 and is connected to the casing of a suitable expansion valve 80.

Figure 6:
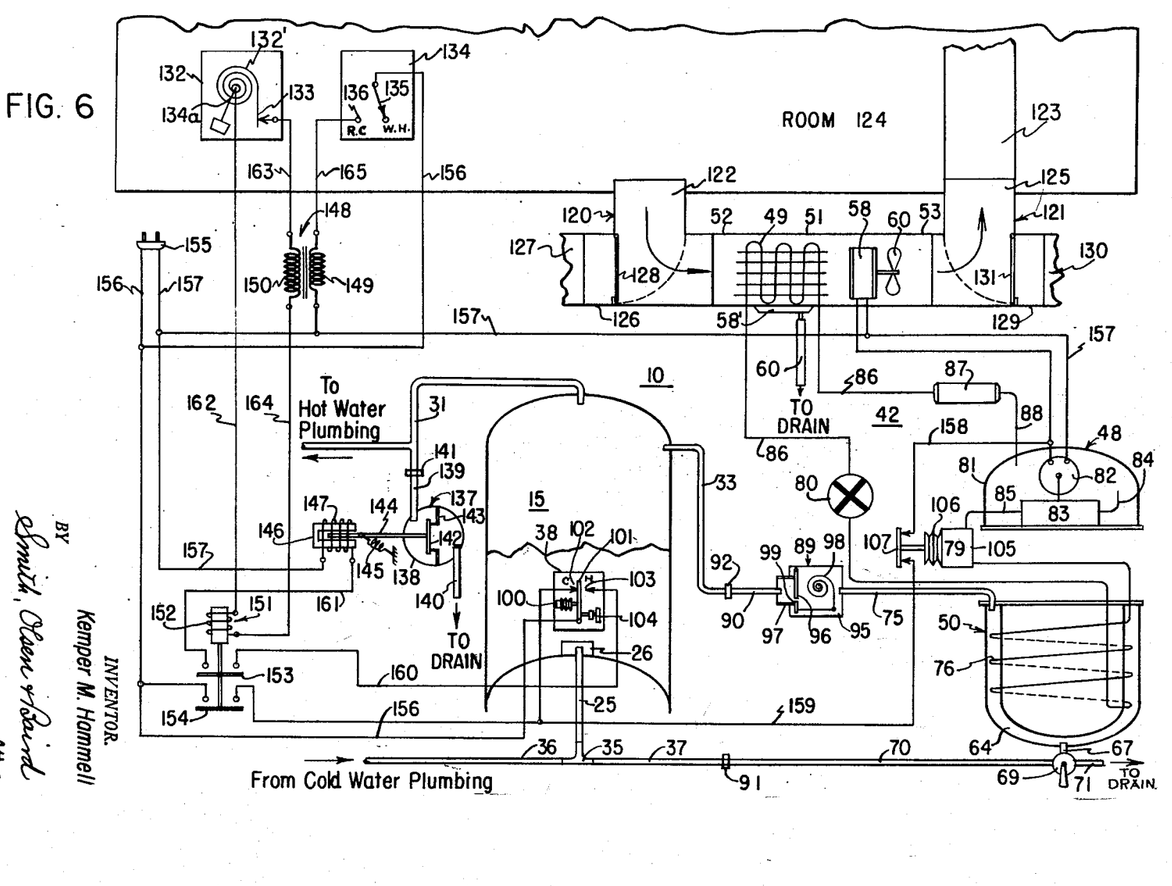
Fig. 6 is a combined electrical and mechanical diagram of a combination water heating and room cooling system incorporating the heater-cooler shown in Figs. 1 to 4, inclusive, and that may be employed in carrying out the method of the present invention.

As diagrammatically illustrated in Fig. 6, the motor-compressor unit 48 comprises a sealed casing 81 housing an electric motor 82 and a compressor 83 that may be of any suitable type. The compressor 83 is provided with an inlet conduit 84 communicating with the interior of the casing 81 and an outlet conduit 85 that extends through a sealed opening in the casing 81 and communicates with the casing of the high pressure controller 79. Also the casing of the expansion valve 8 communicates with the inlet side of a conduit 86 extending through the evaporator 49; and the outlet side of the conduit 86 communicates with the casing of a drier 87 that may be of the silica-gel type; and the casing of the drier 87 communicates with a conduit 88, that, in turn, communicates through a sealed opening provided in the casing 81 with the interior thereof. As best shown in Fig. 4, the casing 81 of the motor-compressor unit 48 is resiliently mounted upon the supporting plate 65 by an arrangement including a plurality of compression coil springs 89'.

In view of the foregoing description of the connection and arrangement of the refrigerating machine 42, it will be understood that the compressor 83 draws expanded gaseous refrigerant from the interior of the casing 81 and compresses it and then discharges it through the conduit 85 into the casing of the high pressure controller 79, the gaseous refrigerant being superheated as a consequence of the compression thereof. The compressed gaseous refrigerant is then conducted from the casing of the high pressure controller 79 into the upper portion of the refrigerant conduit 76, whereby it passes therethrough downwardly toward the lower portion thereof. The compressed gaseous refrigerant delivered to the upper portion of the refrigerant conduit 76 contains considerable superheat, whereby the turns adjacent to the upper portion of the refrigerant conduit 76 extract this superheat and comprise a desuperheating region of the condenser 50. The compressed gaseous refrigerant is condensed in the intermediate turns of the refrigerant conduit 76 so that the latent heat of condensation is removed therefrom, whereby these turns thereof constitute a condensing region of the condenser 50. The liquid refrigerant accumulates in the lower turns of the refrigerant conduit 76, whereby it is subcooled so that these turns thereof constitute a subcooling region of the condenser 50. The subcooled liquid refrigerant is then delivered from the lower portion of the refrigerant conduit 76 into the casing of the expansion valve 80 wherein it is appropriately expanded back into the conduit 86 adjacent to the inlet end of the evaporator 49. The expanded gaseous refrigerant is then withdrawn from the conduit 86 into the casing of the drier 87 so that any slugs of liquid refrigerant are trapped by the silica-gel in the drier 87. The expanded gaseous refrigerant is then conducted from the casing of the drier 87 via the conduit 88 back into the interior of the casing 81 of the motor-compressor unit 48 completing the refrigerant cycle.

Further the supporting plate 65 carries a thermostatic valve 89 that is provided with a casing that is connected to the circulation conduit 75, the casing of the valve 89 being also connected to a circulation conduit 90. The adjacent ends of the circulation conduits 37 and 70 are respectively connected together by a detachable union 91; and the adjacent ends of the circulation conduits 33 and 90 are respectively connected together by a detachable union 92. Finally the mid-portion of the side wall 45 is provided with a removable door or panel 93 permitting inspection of the interior of the casing 43 and access to the refrigerating machine 42; and insulating material 94, glass wool, or the like, is arranged within the lower portion of the casing 43 embedding the motor-compressor unit 48, as well as the heat exchanger 50.

In view of the foregoing description of the heater-cooler 10, it will be understood that the elements 11 and 12 may be readily connected and disconnected with respect to each other, whereby the element 12 may be readily incorporated in an existing hot water heating system including the unit 11. Moreover the element 12 may be readily detached from the element 11 to permit adjustment and repair of the refrigerating machine 42. In fact, in assembling the unit 12 with respect to the unit 11, fundamentally it is necessary only to make the plumbing connections at the unions 91 and 92 and to place the trim element 47 with respect to the casings 16 and 43.

Also it will be understood that the cold water supply plumbing 36 communicates with the T-fixture 35 and consequently with the cold water inlet conduit 25 and with the circulation conduit 37. The cold water inlet conduit 25 is in communication with the lower portion of the tank 15, as previously noted; and the circulation conduit 37 communicates with the valve 69 via the circulation conduit 70 and the union 91. As previously noted, the manual control valve 69 is of the three-position type, so that it may be set into a first position opening the circulation conduit 70 into the fixture 67 and closing the drain conduit 71, so that it may be set into a second position opening the fixture 67 into the drain conduit 71 and closing the circulation conduit 70 and so that it may be set into a third position opening the circulation conduit 70 into the drain conduit 71 and closing the fixture 67. Assuming that the valve 69 occupies its first position, the circulation conduit 70 is placed in communication with the fixture 67 and consequently with the lower portion of the chamber 64, whereby water from the circulation conduit 70 may enter the lower portion of the chamber 64. The water in the chamber 64 is heated by the refrigerant conduit 76 and rises in the chamber 64 about the refrigerant conduit 76 and through the structures 77 and 78 into the upper portion of the chamber 64 as a consequence of the thermo-siphon action produced in the heat exchanger 50. The hot water rising in the chamber 64 passes through the circulation conduit 75 into the casing of the thermostatic valve 89 from which the hot water may pass via the circulation conduit 90, the union 92 and the circulation conduit 33 back into the upper portion of the tank 15.

As best shown in Fig. 6, the thermostatic valve 89 comprises a casing 95 housing a movable valve element 96 that is normally arranged to close an associated valve seat structure 97, as well as a thermal responsive element 98 arranged within the casing 95. Also a small by-pass opening 99 is formed in the valve element 96 for the purpose of accommodating the flow of a small amount of the water through the casing 95 when the valve element 96 occupies its closed position with respect to the valve seat structure 97, so that the thermal element 98 in the casing 95 may accurately respond to the temperature of the water delivered from the upper portion of the chamber 64 into the casing 95. The thermal element 98 is adjusted so that when the hot water delivered into the casing 95 has a predetermined temperature, the thermal element 98 operates the valve element 96 from its normally closed position into its open position in order to permit free communication between the circulation conduits 75 and 90.

As best shown in Fig. 6, the thermostatic switch 38 comprises a thermal element 100 that is in the form of a fluid bellows arranged in good heat exchange relation with the lower portion of the side wall 21 of the tank 15, and a switch element 101 provided with respective cold and hot contacts 102 and 103. Also a manually adjustable control knob 104 is provided for the purpose of adjusting the temperature at which the switch element 101 is operated selectively to close the cold contacts 102 and to close the hot contacts 103. In view of the foregoing, it will be understood that when the temperature of the water stored in the lower portion of the tank 15 is below a predetermined temperature, the switch element 101 occupies its left-hand position closing the cold contacts 102 and opening the hot contacts 103. On the other hand, when the temperature of the water stored in the lower portion of the tank 15 is elevated to the predetermined temperature mentioned, the switch element 101 is operated to its right-hand position opening the cold contacts 102 and closing the hot contacts 103.

Also as best shown in Fig. 6, the high-pressure controller 79 that is connected between the conduit 85 and the upper portion of the refrigerant conduit 76 comprises a casing 105 communicating with the high pressure side of the compressor 83 and an associated bellows 106 that is operated in the event the pressure of the compressed refrigerant delivered from the compressor 83 exceeds a predetermined pressure indicating an abnormal operating condition of the refrigerating machine 42. The bellows 106 carries a contactor 107 that is operated between its normally closed circuit position and its open circuit position in the event of the abnormal high pressure of the compressed refrigerant delivered from the compressor 83 and that is employed for a purpose more fully explained hereinafter.

Considering now the overall operating characteristic of the heater-cooler 10, it may be assumed that the refrigerating machine 42 employs F-12 as a refrigerant, that it is desirable to store hot water in the tank 15 at a temperature of 150° F., that the ambient temperature of the cold water in the cold water supply plumbing 36 is 50° F., and that the ambient temperature of the air in the room housing the heater-cooler 10 is 70° F. In this case, it is satisfactory to adjust the thermostatic switch 38 so that it is operated at a temperature in the range 115° F. to 120° F., whereby it may be assumed that the switch element 101 is operated to close the hot contacts 103 when the temperature of the water in the lower portion of the tank 15 is elevated to 120° F., and that the switch element 101 is operated to close the cold contacts 102 when the temperature of the water in the lower portion of the tank 115 is lowered to 115° F. Also in this case, the thermostatic valve 89 is set to operate from its closed position into its open position when the temperature of the water delivered into the casing 95 thereof exceeds 150° F. Further the high pressure controller 79 is adjusted so that the contactor 107 is operated into its open circuit position in response to a high pressure of approximately 275 lbs. per square inch. Now assuming that the water in the tank 15 is cold so that the thermostatic switch 38 is controlled to operate the switch element 101 to close the cold contacts 102 and that there is no gauge pressure in the casing 105 of the high pressure controller 79 so that the contactor 107 occupies its closed circuit position, at this time, cold water from the cold water plumbing 36 enters the T fixture 35 so that the tank 15 is completely filled with cold water and so that the chamber 64 in the heat exchanger 50 is completely filled with cold water. Also at this time, it may be assumed that the circulation conduits 37, 70, 75, 90 and 33, as well as the heat trap conduit 29, are filled with cold water. When the heater-cooler 10 is connected to a suitable source of electrical supply, operation of the motor 82 of the motor-compressor unit 48 is initiated and operation of the motor 58 is initiated to drive the fan 60.

The motor 82 drives the compressor 83 initiating operation of the refrigerating machine 42, whereby the refrigerating machine 42 reaches its normal operating condition in a short interval of time. Under normal operation conditons, the temperature of the compressed refrigerant delivered from the compressor 83 into the conduit 85 may be approximately 240° F. so that the compressed refrigerant entering the desuperheating of the refrigerant conduit 76 contains considerable superheat and has a temperature somewhat below the 240° F. mentioned. The superheat of the compressed refrigerant is removed in the de-superheating region of the heat exchanger 50, whereby the temperature of the condensing region of the superheater 50 is approximately 140° F. The liquid refrigerant accumulating in the subcooling region of the heat exchanger 50 is appreciably cooled so that the liquid refrigerant delivered into the expansion valve 80 has a temperature of approximately 70° F. As the liquid refrigerant is expanded by the expansion valve 80 into the conduit 86, the temperature of the expanded gaseous refrigerant falls to a temperature of approximately 45° F., whereby the temperature of the evaporator 49 is maintained somewhat above 45° F. The expanded gaseous refrigerant is heated in the evaporator 49 so that the temperature thereof may be approximately 50° F. as it is delivered into the drier 87. The operating fan 60 circulates the air through the openings 54 and 56 in the casing 43 and through the duct 51 at the ambient temperature of 70° F., whereby heat is supplied from the circulated air to the evaporator 49.

The water in the chamber 64 is heated since it is in good heat exchange relation with the refrigerant conduit 76 so that the water in the chamber 64 rises therein producing a thermo-siphon circulation from the fixture 67 into the circulation conduit 75 and into the casing 95 of the thermostatic valve 89. At this time, the valve element 96 of the thermostatic valve 89 occupies its closed position with respect to the valve seat element 97, whereby only a small amount of the water in the casing 95 is by-passed through the opening 99 formed in the valve element 96 into the circulation conduit 90 and thence via the union 92 and the circulation conduit 33 into the upper portion of the tank 15. Of course, at this time, a small amount of water in the lower portion of the tank 15 passes via the conduit 25, the T fixture 35, the circulation conduit 37, the union 91, the circulation conduit 70, and the valve 69 into the fixture 67 and thence into the lower portion of the chamber 64 in the heat exchanger 50. Accordingly at this time, there is a very small circulation of water between the lower portion of tank 15, the heat exchanger 50 and the upper portion of the tank 15, but this circulation is of no material consequence by virtue of the fact that the thermostatic valve 89 occupies its closed position. As previously noted, this small circulation is maintained so that the thermal element 98 of the thermostatic valve 89 may accurately respond to the temperature of the water in the upper portion of the heat exchanger 50.

After a time interval, the water in the upper portion of the heat exchanger 50 is elevated somewhat above the desired storage temperature 150° F., whereby the thermal element 98 of the thermostatic valve 89 operates the valve element 96 from its normally closed position into its open position. At this time, free and unrestricted thermo-siphon circulation takes place between the lower portion of the tank 15, the heat exchanger 50, and the upper portion of the tank 15. Thus it will be understood that cold water at a temperature of approximately 50° F. is delivered from the lower portion of the tank 15, and that hot water at somewhat above 150° F. is returned to the upper portion of the tank 15 by virtue of the arrangement of the heat exchanger 50 and the thermal responsive valve 89. This arrangement positively insures stratification of the hot water in the tank 15. Of course the hot water delivered to the upper portion of the tank 15 does effect some heating of the cold water disposed in the lower portion of the tank 15, but this heat exchange is not to such an extent that there is any interference with stratification of the water in the tank 15. The thermo-siphon cycle above described continues, and gradually the upper portion of the tank 15 is filled toward the lower portion thereof with hot water to such an extent that the temperature of the water in the lower portion of the tank 15 reaches the 120° F., whereby the thermostatic switch 38 is operated to arrest operation of the motor 82 of the motor-compressor unit 48 and the motor 58 driving the fan 60. At this time, the tank 15 is substantially completely filled with the hot water at the desired storage temperature of 150° F., the water only in the lower low portion of the tank 15 being at the temperature of approximately 120° F., and operation of the refrigerating machine 42 is arrested.

Now, in the event of a demand for hot water from the hot water plumbing 31, hot water is withdrawn from the upper portion of the tank 15 via the heat trap conduit 29, and cold water is supplied to the lower portion of the tank 15 via the cold water plumbing 36 so as to maintain the tank 15 substantially full of water at all times. As the cold water is thus applied via the conduit 25 into the lower portion of the tank 15, the baffle 26 prevents undesired mixing of the cold water with the hot water stored in the upper portion of the tank 15, whereby the quantity of hot water stored in the upper portion of the tank 15 is maintained at the desired storage temperature of 150° F. The cold water entering the lower portion of the tank 15 causes the thermal element 100 of the thermostatic switch 38 to respond, whereby the switch element 101 is again operated to close the cold contacts 102 and to open the hot contacts 103 so as to initiate further operation of the refrigerating machine 42. More particularly the refrigerating machine 42 again operates in order to effect the storage of additional hot water in the tank 15 so that the thermostatic switch 38 is again operated to arrest the operation of the refrigerating machine 42, in the manner previously explained.

During the course of operation of the heater-cooler 10, it will be understood that the thermostatic valve 89 insures that the hot water that is delivered from the heat exchanger 50 into the upper portion of the tank 15 is at least at the desired storage temperature of 150° F., and at any time, should the hot water delivered from the upper portion of the heat exchanger 50 fall below the temperature of 150° F. the thermal element 98 of the thermostatic valve 89 again operates the valve element 96 into its closed position with respect to the valve seat structure 97. Of course during operation of the refrigerating machine 42, the air that is circulated by the fan 60 through the evaporator 49 is cooled and may be employed for the general purpose of cooling the air in the room in which the heater-cooler 10 is located. In any case, this cooling of the air in the room in which the heater-cooler 10 is located is very useful in that the air thus circulated is dehumidified preventing dampness in the room. The moisture that is condensed out of the air that is circulated through the evaporator 49 accumulates upon the evaporator 49 and drips into the drip tray 58′ from which it is conducted via the conduit 59' and the drain hose 60 to the drain plumbing. Also during the operation of the refrigerating machine 42, the heat that is developed both in the motor 82 and in the compressor 83 of the motor-compressor unit 48 is conserved by virtue of the insulating material 94, whereby this heat is dissipated primarily in the compressed gaseous refrigerant delivered from the compressor 83 via the conduit 85 into the casing 105 of the high pressure controller 79 contributing essentially to the amount of superheat that is contained in this compressed gaseous refrigerant. Also the insulating material 94 prevents undesired heat exchange between the heat exchanger 50 and the air in the room in which the heater-cooler 10 is located.

At any time the chamber 64 in the heat exchanger 50 may be back-flushed by operating the manual valve 69 into its second position so as to connect the fixture 67 to the drain conduit 71 and to cut-off the connection between the circulation conduit 70 and the fixture 67. The cold water entering the lower portion of the tank 15 rises therein causing water in the upper portion of the tank 15 to be back-flushed through the circulation conduit 33 and thence into the chamber 64 of the heat exchanger 50 and ultimately out of the drain conduit 71. This arrangement provides for the ready back-flushing of the tank 15 and the heat exchanger 50 in order to remove any sediment therefrom. Also circulation between the tank 15 and the heat exchanger 50 may be arrested by operating the valve 69 into its third position so as to cut-off communication between the fixture 67 and the circulation conduit 70 and the drain conduit 71.

During the operation of the refrigerating machine 42, should the heat exchanger 50 fail so that condensation of the compressed gaseous refrigerant in the heat exchanger 50 is prevented an abnormal high pressure develops in the casing 105 of the high pressure controller 79, whereby the contactor 107 is operated into its open circuit position to arrest operation of the motor 82 of the motor-compressor unit 48 and the motor 58 driving the fan 60. This arrangement is provided entirely for protection purposes and operation thereof is not effected during normal operation of the refrigerating machine 42.

In the embodiment of the heater-cooler 10 illustrated, the storage tank 15 has a volume of substantially 52 gallons, the tank 15 having a diameter of approximately 16 inches and an overall height of approximately 61 inches. Also in the heat exchanger 50 the chamber 64 has an effective volume of approximately two gallons and a height of approximately 13½ inches; the refrigerating machine 42 has a capacity of approximately ¾ ton, and the motors 82 and 58 are operable upon a voltage of 110 volts A. C. single phase. More particularly, the motor 82 draws approximately 1100 watts during normal operation of the refrigerating machine 42 and the coefficient of performance of the heater-cooler 10 is approximately 2.9.

Figure 5:
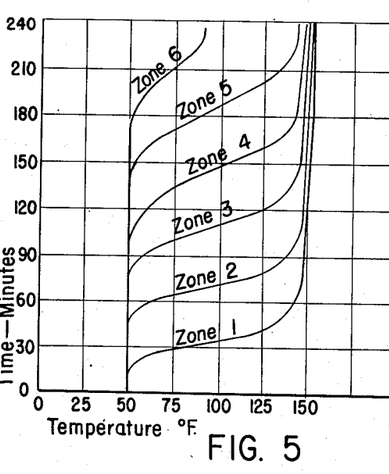
Fig. 5 is a diagrammatic representation of the performance of the heater-cooler shown in Figs. 1 to 4, inclusive, demonstrating stratification of the different zones of hot water in the storage tank incorporated therein.

The performance of this embodiment of the heater-cooler 10 is illustrated in Fig. 5; and in accumulating this data, six thermocouples were arranged in the mid-portions of six substantially equally spaced-apart zones in the tank 15. Specifically the zones 1 to 6, inclusive, were arranged from the upper portion of the tank 15 toward the lower portion thereof, as indicated in Fig. 4. In this test, the temperature of the cold water in the cold water supply plumbing 36 was 50° F., as indicated in Fig. 5, and the remainder of the apparatus was at an initial ambient temperature of approximately 70° F. Approximately 15 minutes after operation of the heater-cooler 10 was initiated, heating of the water in zone 1 in the uppermost portion of the tank 15 became measurable, and after an elapsed time of approximately 120 minutes, the temperature of the water in zone 1 of the tank 15 was approximately 150° F. By this time, the temperature of the water in zones 2, 3 and 4 had begun to rise as indicated in Fig. 5. As the test was continued throughout a time-interval of substantially 240 minutes, the temperatures of the water in zones 1 to 5, inclusive, rose to substantially the desired storage temperature of 150° F., the uppermost zone 1 being somewhat above this temperature and the lowermost zone 5 being somewhat below this temperature. At this time, the temperature of the water in the lowermost zone 6 had reached a temperature of approximately 90° F., and the test was terminated. The family of curves illustrated in Fig. 5 clearly demonstrates stratification of the hot water stored in the tank 15, whereby it will be appreciated that after operation of the heater-cooler 10 from the initial ambient temperatures noted during only a very short interval of time, there is some usable hot water stored in the tank 15. In fact, after one-half hour, there is at least seven gallons of usable hot water stored in the tank 15; and after one hour, there is at least fourteen gallons of usable hot water stored in the tank 15. Moreover the complete storage of 52 gallons of usable hot water in the tank 15 takes place after a running time of only 3 hours and 45 minutes of the refrigerating machine 42 from an initial start at the ambient temperatures noted. Of course the coefficient of performance of the heater-cooler 10 is dependent upon the humidity of the air circulated by the fan 60 through the evaporator 49, the coefficient being high when the humidity is relatively high. In the test noted, the coefficient of performance was calculated at 2.93 when the relative humidity was 32% and the dry bulb temperature of the atmosphere was 79° F. and the wet bulb temperature of the atmosphere was 60° F.

Referring now more particularly to Fig. 6, a combined hot water heating and room cooling system is there illustrated that comprises the heater-cooler 10. More particularly, in this arrangement, the leg 52 of the duct 51 is connected to a ventilating T-fixture 120; and the leg 53 of the duct 51 is connected to a ventilating T-fixture 121. The T-fixture 120 comprises a stem 122 that communicates with the lower portion of a room 124; and T-fixture 121 comprises a stem 125 that is connected to a ventilating conduit 123, that, in turn, communicates with the upper portion of the room 124. Also the T-fixture 120 is provided with a duct 126 that communicates with another ventilating conduit 127, as well as a valve element 128 that is movable between two positions selectively to place either the stem 122 or the duct 126 into communication with the leg 52. Similarly the T-fixture 121 is provided with a duct 129 that communicates with another ventilating conduit 130, as well as a valve element 131 that is movable between two positions selectively to place either the stem 125 or the duct 129 into communication with the leg 53. Thus it will be understood that when the valve elements 128 and 131 occupy their positions illustrated, the fan 60 is operative to draw air from the lower portion of the room 124, to circulate the air through the evaporator 49 and then to deliver the air into the upper portion of the room 124. On the other hand, when the valve elements 128 and 131 occupy their operated positions, the fan 60 is operative to draw air from the conduit 127 to circulate the air through the evaporator 49 and then to discharge the air through the conduit 130.

Also the room 124 is provided with a room thermostat 132 that includes a pair of contacts 133 and a thermal responsive element 132'. Further the room 124 is provided with a control switch 134 including a manually operable switch element 135, the switch element 135 being operable between a water heating position illustrated and a room cooling position in which the switch element 135 engages a contact 136. Further the system comprises a solenoid controlled valve 137 that includes a casing 138 provided with an inlet conduit 139 and a drain conduit 140. The inlet conduit 139 is connected by a union 141 to the hot water plumbing 31; and the drain conduit 140 communicates with drain plumbing, not shown. Arranged within the casing 138 of the valve 137 is a valve element 142 that cooperates with valve seat structure 143, the valve element 142 being carried by an operating stem 144 that is biased by a resilient spring 145 to cause the valve element 142 normally to close the valve seat element 143. Also the valve 137 comprises an operating solenoid 146 provided with an operating winding 147.

Further the system comprises a transformer 148 provided with primary and secondary windings 149 and 150, as well as an electromagnetic relay 151 that includes an operating winding 152 and a pair of contactors 153 and 154. Finally the system comprises a plug 155 that is adapted to be connected to a source of 110 volts A. C. single phase.

In the circuit network, the plug 155 terminates two line conductors 156 and 157. The line conductor 157 is commonly connected to one terminal of the motor 58 and to one terminal of the motor 82; while the other terminals of the motors 58 and 82 are commonly connected by a conductor 158 to one contact of the contactor 107. The other contact of the contactor 107 is connected by a conductor 159 commonly to one of the cold contacts 102 of the thermal switch 38 and to one of the contacts of the contactor 154. The line conductor 156 is commonly connected to the other contact of the contactor 154 and to the switch element 101 of the thermal switch 38. One of the hot contacts 103 of the thermal switch 38 is connected by a conductor 160 to one of the contacts of the contactor 153; while the other contact of the contactor 153 is connected by a conductor 161 to one terminal of the winding 147 of the solenoid 146, the other terminal of the winding 147 of the solenoid 146 being connected to the line conductor 157. One terminal of the winding 152 of the relay 151 is connected by a conductor 162 to the moving contact 133 of the room thermostat 132; and the stationary contact 133 of the room thermostat 132 is connected by a conductor 163 to one terminal of the secondary winding 150 of the transformer 148, the other terminal of the secondary winding 150 of the transformer 148 being connected by a conductor 164 to the other terminal of the winding 152 of the relay 151. One terminal of the primary winding 149 of the transformer 148 is connected to the line conductor 157; and the other terminal of the primary winding 149 is connected by a conductor 165 to the contact 136 of the control switch 134.

Considering now the operation of the water heating and room cooling system, it may be assumed that it is desired primarily to heat the water in the tank 15, the cooling of the air in the room 124 being only incidental to the heating of the water in the tank 15, the control switch 134 is set into its water heating position. At this time, it may be assumed that the air in the room 124 is warm so that the room thermostat 132 is operated to close the contacts 133 thereof. However the circuit to the primary winding 149 of the transformer 148 is not closed by virtue of the position of the switch element 135 of the control switch 134 in its water heating position as previously noted. Also at this time, the switch element 101 of the thermal switch 38 closes the cold contacts 102 and opens the hot contacts 103, as it may be assumed that the water in the tank 15 is cold. Further, the high pressure controller 79 operates the contactor 107 into its closed circuit position. At this time, when the plug 155 is connected to the source of current, a circuit, including the cold contacts 102 of the thermal switch 38 and the contactor 107 in its closed circuit position, is completed for operating the motor 82 of the motor-compressor unit 48 and the motor 58 driving the fan 60. Since the control switch 134 occupies its water heating position, the primary winding 149 of the transformer 148 is not energized, whereby the secondary winding 150 is not energized so that the relay 151 remains in its restored position.

Operation of the motor 82 effects operation of the refrigerating machine 42 so as to effect heating of the water in the tank 15 and cooling of the air circulated by the fan 60, all in the manner previously explained. Accordingly the water in the tank 15 is progressively heated and the air in the room 124 is circulated and progressively cooled incident to heating of the water in the tank 15. When the water in the lower portion of the tank 15 is heated to the predetermined temperature of approximately 120° F., the thermal switch 38 operates to open the cold contacts 102 in order to arrest operation of the motors 82 and 58, thereby to arrest operation of the refrigerating machine 42 and circulation of the air in the room 124. The refrigerating machine 42 is cycled "on" and "off" in accordance with the temperature of the water in the lower portion of the tank 15 under the control of the thermal switch 38 in the manner previously explained.

Now assuming that it is desired primarily to cool the room 124, the control switch 134 is operated into its room cooling position, whereby the switch element 135 closes the room cooling contact 136 effecting energization of the primary winding 149 of the transformer 148 so that the secondary winding 151 is energized effecting closure of the circuit for energizing the winding 152 of the relay 150 since the room thermostat 132 closes the contacts 133. When the winding 152 of the relay 151 is thus energized it operates to close the contactors 153 and 154. Closure of the contactor 153 prepares a circuit for energizing the operated winding 147 of the solenoid 146; and closure of the contactor 154 completes a multiple circuit around the cold contacts 102 of the thermal switch 38 for insuring operation of the motors 82 and 58 independently of the position of the switch element 101 of the thermal switch 38. At this time, it may be assumed that the switch element 101 of the thermal switch 38 occupies its position closing the cold contacts 102 and opening the hot contacts 103. Accordingly heating of the water in the tank 15 and cooling of the air in the room 124 proceeds.

Now it may be first assumed that the room 124 is cooled to the desired room temperature prior to complete heating of the water in the tank 15. In this case, the room thermostat 132 is operated to open the contacts 133 while the thermal switch 38 occupies its position retaining closed the cold contacts 102 and retaining open the hot contacts 103. In this case, when the room thermostat 132 responds to the desired temperature of the room 124 opening the contacts 133, the winding 152 of the relay 151 is deenergized causing the latter relay to restore in order to open the contactors 153 and 154. When the contactor 153 is thus opened, the previously-prepared circuit for energizing the operating winding 147 of the solenoid 146 is interrupted; and when the contactor 154 is thus opened, the multiple circuit for operating the motors 82 and 58 is interrupted. Accordingly operation of the motors 82 and 58 proceeds under the control of the thermal switch 38, whereby further heating of the water in the tank 15 is effected and further cooling of the air in the room 124 is effected incidental to the operation of the refrigerating machine 42. In passing, it is noted that the further cooling of the air in the room 124 is not objectionable since there will be no substantial cooling thereof below the predetermined desired room temperature during the short time interval that the refrigerating machine 42 may be operated to effect complete heating of the water in the tank 15. Moreover, the room thermostat 132' is provided with a manually adjustable knob 134a so that the desired temperature of the air in the room 124 may be selectively set within a predetermined range of temperatures.

Now assuming that during the operation of the system, the water in the tank 15 is completely heated before the temperature of the air in the room 124 is reduced to the desired room temperature, which is the usual case. In this case, further operation of the refrigerating machine 42 is necessary in order to cool the air in the room 124 to the desired temperature; however, further heating of the water in the tank 15 is impractical since the water in the tank 15 has already been heated to the desired storage temperature of 150° F. In this case, when the thermal switch 38 is operated in response to the temperature of the water in the lower portion of the tank 15, the cold contacts 102 are opened and the hot contacts 103 are closed by the switch element 101. Opening of the cold contacts 102 is without effect since the contactor 154 occupies its closed position; however, closing of the hot contacts 103 completes a circuit, including the closed contactor 153, for energizing the operating winding 147 of the solenoid 146. More particularly the solenoid 146 is operated to open the valve element 142 with respect to the valve seat element 143 so that the hot water in the hot water plumbing 31 may escape through the casing 138 of the valve 137 and the drain conduit 140 into the drain plumbing, not shown. After the valve 137 has been operated into its open position permitting the escape of hot water for a short time interval from the upper portion of the tank 15, the thermal switch 38 again responds to the temperature of the water in the lower portion of the tank 15, opening the hot contacts 103 and closing the cold contacts 102. When the hot contacts 103 are thus opened, the circuit for energizing the operating winding 147 of the solenoid 146 is de-energized, whereby the solenoid 146 returns the valve 137 into its closed position by virtue of the biasing spring 145 so as to prevent further escape of the hot water from the upper portion of the tank 15. The thermal switch 38 continues to re-cycle the cold contacts 102 and the hot contacts 103 in order intermittently to control the solenoid 146 so that the valve 137 is intermittently operated into its open position in the manner described above until the air in the room 124 has been cooled to the desired temperature. When the air in the room 124 is cooled to the desired temperature, the room thermostat 132 responds effecting restoration of the relay 151, whereby the refrigerating machine 42 is placed under the sole control of the thermostatic switch 38. Thus when the tank 15 is again completely filled with hot water, operation of the thermal switch 38 arrests operation of the refrigerating machine 42.

In view of the foregoing, it will be understood that when the control switch 134 occupies its room cooling position, the operation of the refrigerating machine 42 is under the joint control of the room thermostat 132 and the thermal switch 38 so that operation of the refrigerating machine 42 is arrested only in response to cooling of the air in the room 124 at least to the desired temperature and to heating of the water in the tank 15 to the desired storage temperature. This arrangement is very advantageous in view of the fact that incident to cooling the room 124, the water in the tank 15 is heated for ordinary use in the hot water plumbing 31, and the water is not permitted to escape from the upper portion of the tank 15 until it is completely heated from the ambient temperature of approximately 50° F. to the desired storage temperature of approximately 150° F. This arrangement insures that all of the water discharged from the system has been effectively employed in cooling the condenser 50 of the refrigerating machine 42 and has been elevated in temperature between the ambient temperature of approximately 50° F. and the discharge temperature of approximately 150° F. Accordingly when the system is set primarily for room cooling operation efficient utilization of the water for the purpose of cooling the condenser 50 of the refrigerating machine 42 is made so as materially to contribute to economical operation of the system.

In view of the foregoing, it is apparent that there has been provided an improved heater-cooler and method of operating the same, as well as an improved water heating and room cooling system and method of operating the same. Also the heater-cooler is of improved and simplified construction and arrangement; and the circuit network for controlling operation of the system is of simple and economical connection and arrangement.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a water heating system including an upstanding hot water storage tank, a cold water inlet connection communicating with the lower portion of said tank, and a hot water outlet connection communicating with the upper portion of said tank; the combination comprising an upstanding water vessel, a first conduit communicating between the lower portion of said tank and the lower portion of said vessel, a second conduit communicating between the upper portion of said tank and the upper portion of said vessel, means for heating the water in said vessel in order to cause the water to rise therein so as to induce a thermo-siphon circulation of the water from the lower portion of said tank via said first conduit into the lower portion of said vessel and from the upper portion of said vessel via said second conduit into the upper portion of said tank, a valve arranged in said second conduit and selectively operable to control the passage therethrough of the water from the upper portion of said vessel into the upper portion of said tank, and thermal responsive means for selectively operating said valve.

2. In a water heating system including an upstanding hot water storage tank, a cold water inlet connection communicating with the lower portion of said tank, and a hot water outlet connection communicating with the upper portion of said tank; the combination comprising an upstanding water vessel, a first conduit communicating between the lower portion of said tank and the lower portion of said vessel, a second conduit communicating between the upper portion of said tank and the upper portion of said vessel, means for heating the water in said vessel in order to cause the water to rise therein so as to induce a thermo-siphon circulation of the water from the lower portion of said tank via said first conduit into the lower portion of said vessel and from the upper portion of said vessel via said second conduit into the upper portion of said tank, a valve arranged in said second conduit and selectively operable between open and closed positions to control the passage therethrough of the water from the upper portion of said vessel into the upper portion of said tank, and means including a thermal device responsive to temperatures of the water in said second conduit respectively disposed somewhat above and somewhat below a predetermined temperature at which it is desired to store the water in said tank for respectively operating said valve into its open and closed positions.

3. In a water heating system including an upstanding hot water storage tank, a cold water inlet connection communicating with the lower portion of said tank, and a hot water outlet connection communicating with the upper portion of said tank; the combination comprising an upstanding water vessel, a first conduit communicating between the lower portion of said tank and the lower portion of said vessel, a second conduit communicating between the upper portion of said tank and the upper portion of said vessel, means for heating the water in said vessel in order to cause the water to rise therein so as to induce a thermo-siphon circulation of the water from the lower portion of said tank via said first conduit into the lower portion of said vessel and from the upper portion of said vessel via said second conduit into the upper portion of said tank, and a thermal valve provided with a casing arranged in said second conduit near the end thereof communicating with the upper portion of said vessel, said valve including a valve element selectively operable between open and closed positions to control the passage through said casing of the water via said second conduit between the upper portion of said vessel and the upper portion of said tank, said valve also including a thermal element responsive to temperatures of the water entering said casing respectively disposed somewhat above and somewhat below a predetermined temperature at which it is desired to store the water in said tank for respectively operating said valve element into its open and closed positions, said valve further including structure providing a restricted by-pass opening through said casing around said valve element so that there is no substantial difference in temperature between the water in the upper portion of said vessel and the water entering said casing when said valve element is operated into its closed position.

4. In a water heating system, including an upstanding hot water storage tank, a cold water inlet connection communicating with the lower portion of said tank, and a hot water outlet connection communicating with the upper portion of said tank; the combination comprising an upstanding water vessel, a first conduit communicating between the lower portion of said tank and the lower portion of said vessel, a second conduit communicating between the upper portion of said tank and the upper portion of said vessel, a heating element operable to heat the water in said vessel in order to cause the water to rise therein so as to induce a thermo-siphon circulation of the water from the lower portion of said tank via said first conduit into the lower portion of said vessel and from the upper portion of said vessel via said second conduit into the upper portion of said tank, means responsive to the temperature of the water in the lower portion of said tank for selectively operating said heating element, a valve arranged in said second conduit and selectively operable to control the passage therethrough of the water from the upper portion of said vessel into the upper portion of said tank, and thermal responsive means for selectively operating said valve.

5. In a water heating system including an upstanding hot water storage tank provided with a first fixture communicating with the lower portion thereof and second and third fixtures communicating with the upper portion thereof, a cold water inlet pipe connected to said first fixture and a hot water outlet pipe connected to said second fixture; the combination comprising an upstanding water vessel provided with fourth and fifth fixtures respectively communicating with the lower and upper portions thereof, a first conduit connected between said first and fourth fixtures, a second conduit connected between said third and fifth fixtures, said first and second conduits respectively including first and second detachable unions accommodating ready connection and disconnection of said tank and said vessel with respect to each other, means for heating the water in said vessel in order to cause the water to rise therein so as to induce a thermo-siphon circulation of the water from the lower portion of said tank via said first conduit into the lower portion of said vessel and from the upper portion of said vessel via said second conduit into the upper portion of said tank, a valve arranged in said second conduit between the upper portion of said vessel and said second union and selectively operable to control the passage therethrough of the water from the upper portion of said vessel into the upper portion of said tank, and thermal responsive means for selectively operating said valve.

6. In a water heating system including an upstanding hot water storage tank provided with a first fixture communicating with the lower portion thereof and second and third fixtures communicating with the upper portion thereof, a cold water inlet pipe connected to said first fixture and a hot water outlet pipe connected to said second fixture; the combination comprising an upstanding water vessel provided with fourth and fifth fixtures respectively communicating with the lower and upper portions thereof, a three-way valve mechanism connected to said fourth fixture, a drain pipe connected to said valve mechanism, a first conduit connected between said first fixture and said valve mechanism, a second conduit connected between said third and fifth fixtures, said first and second conduits respectively including first and second detachable unions accommodating ready connection and disconnection of said tank and said vessel with respect to each other, said valve mechanism being operable into its first position to open said first conduit into said fourth fixture and to close said drain pipe and into its second position to open said fourth fixture into said drain pipe and to close said first conduit and into its third position to close said fourth fixture and said first conduit and said drain pipe, means for heating the water in said vessel in order to cause the water to rise therein so as to induce a thermo-siphon circulation of the water from the lower portion of said tank via said first conduit into the lower portion of said vessel and from the upper portion of said vessel via said second conduit into the upper portion of said tank, a valve arranged in said second conduit between the upper portion of said vessel and said second union and selectively operable to control the passage therethrough of the water from the upper portion of said vessel into the upper portion of said tank, and means responsive to the temperature of the water in said second conduit for selectively operating said valve.

7. In a water heating system including an upstanding hot water storage tank, a cold water inlet connection communicating with the lower portion of said tank, and a hot water outlet connection communicating with the upper portion of said tank; the combination comprising an upstanding water vessel, a fluid conduit arranged in good heat exchange relation with said vessel, a first water conduit communicating between the lower portion of said tank and the lower portion of said vessel, a second water conduit communicating between the upper portion of said tank and the upper portion of said vessel, means for passing a hot fluid through said fluid conduit to effect heating of the water in said vessel in order to cause the water to rise therein so as to induce a thermo-siphon circulation of the water from the lower portion of said tank via said first water conduit into the lower portion of said vessel and from the upper portion of said vessel via said second water conduit into the upper portion of said tank, a valve arranged in said second water conduit and selectively operable to control the passage therethrough of the water from the upper portion of said vessel into the upper portion of said tank, and thermal responsive means for selectively operating said valve.

8. In a water heating system including an upstanding hot water storage tank, a cold water inlet connection communicating with the lower portion of said tank, and a hot water outlet connection communicating with the upper portion of said tank; the combination comprising an upstanding water vessel, a fluid conduit arranged in good heat exchange relation with said vessel, a first water conduit communicating between the lower portion of said tank and the lower portion of said vessel, a second water conduit communicating between the upper portion of said tank and the upper portion of said vessel, means for conducting a refrigerant in superheated gaseous form into the upper portion of said fluid conduit and for conducting the refrigerant in subcooled liquid form from the lower portion of said fluid conduit to effect heating of the water in said vessel in order to cause the water to rise therein so as to induce a thermo-siphon circulation of the water from the lower portion of said tank via said first water conduit into the lower portion of said vessel and from the upper portion of said vessel via said second water conduit into the upper portion of said tank, the upper portion of said fluid conduit constituting a refrigerant desuperheating region and the intermediate portion of said fluid conduit constituting a refrigerant condensing region and the lower portion of said fluid conduit constituting a refrigerant subcooling region, a valve arranged in said second water conduit and selectively operable to control the passage therethrough of the water from the upper portion of said vessel into the upper portion of said tank, and thermal responsive means for selectively operating said valve.

9. In a water heating system including an upstanding hot water storage tank, a cold water inlet connection communicating with the lower portion of said tank, and a hot water outlet connection communicating with the upper portion of said tank; the combination comprising an upstanding water vessel, a fluid conduit arranged in good heat exchange relation with said vessel, a first water conduit communicating between the lower portion of said tank and the lower portion of said vessel, a second water conduit communicating between the upper portion of said tank and the upper portion of said vessel, a refrigerant compressor, means for operating said compressor, means for conducting compressed superheated gaseous refrigerant from said compressor into the upper portion of said fluid conduit and for conducting subcooled liquid refrigerant from the lower portion of said fluid conduit to effect heating of the water in said vessel in order to cause the water to rise therein so as to induce a thermo-siphon circulation of the water from the lower portion of said tank via said first water conduit into the lower portion of said vessel and from the upper portion of said vessel via said second water conduit into the upper portion of said tank, the upper portion of said fluid conduit constituting a refrigerant desuperheating region and the intermediate portion of said fluid conduit constituting a refrigerant condensing region and the lower portion of said fluid conduit constituting a refrigerant subcooling region, a refrigerant evaporator, means for expanding the subcooled liquid refrigerant conducted from the lower portion of said fluid conduit in said evaporator, means for conducting the expanded gaseous refrigerant from said evaporator back into said compressor, a valve arranged in said second water conduit and selectively operable to control the passage therethrough of the water from the upper portion of said vessel into the upper portion of said tank, and thermal responsive means for selectively operating said valve.

10. In a water heating system including an upstanding hot water storage tank, a cold water inlet connection communicating with the lower portion of said tank, and a hot water outlet connection communicating with the upper portion of said tank; the combination comprising a water vessel defining an upstanding substantially tubular chamber, a substantially helical fluid conduit arranged in such chamber, the upper and lower portions of said fluid conduit being respectively disposed adjacent to the upper and lower portions of said chamber, a first water conduit communicating between the lower portion of said tank and the lower portion of said chamber, a second water conduit communicating between the upper portion of said tank and the upper portion of said chamber, a refrigerant compressor, means responsive to the temperature of the water in the lower portion of said tank for selectively operating said compressor, means for conducting compressed superheated gaseous refrigerant from said compressor into the upper portion of said fluid conduit and for conducting subcooled liquid refrigerant from the lower portion of said fluid conduit to effect heating of the water in said chamber in order to cause the water to rise therein so as to induce a thermo-siphon circulation of the water from the lower portion of said tank via said first water conduit into the lower portion of said chamber and from the upper portion of said chamber via said second water conduit into the upper portion of said tank, the upper portion of said fluid conduit constituting a refrigerant desuperheating region and the intermediate portion of said fluid conduit constituting a refrigerant condensing region and the lower portion of said fluid conduit constituting a refrigerant subcooling region, a refrigerant evaporator, means for expanding the subcooled liquid refrigerant conducted from the lower portion of said fluid conduit in said evaporator, means for conducting the expanded gaseous refrigerant from said evaporator back into said compressor, a valve arranged in said second water conduit and selectively operable to control the passage therethrough of the water from the upper portion of said chamber into the upper portion of said tank, and thermal responsive means for selectively operating said valve.

11. A water heater comprising a first base, an upstanding hot water storage tank carried by said first base, a first casing carried by said first base and enclosing said tank, a cold water inlet connection communicating with the lower portion of said tank, a hot water outlet connection communicating with the upper portion of said tank, a second base, an upstanding frame carried by said second base, a second casing carried by said second base and enclosing said frame, an upstanding water vessel carried by said frame, a first detachable conduit communicating between the lower portion of said tank and the lower portion of said vessel, a second detachable conduit communicating between the upper portion of said tank and the upper portion of said vessel, said first and second detachable conduits accommodating ready connection and disconnection of said tank and said vessel with respect to each other, means for heating the water in said vessel in order to cause the water to rise therein so as to induce a thermo-siphon circulation of the water from the lower portion of said tank via said first conduit into the lower portion of said vessel and from the upper portion of said vessel via said second conduit into the upper portion of said tank, a valve arranged in said second conduit and selectively operable to control the passage therethrough of the water from the upper portion of said vessel into the upper portion of said tank, and thermal responsive means for selectively operating said valve.

12. A water heater comprising a first base, an upstanding hot water storage tank carried by said first base, a first casing carried by said first base and enclosing said tank, a cold water inlet connection communicating with the lower portion of said tank, a hot water outlet connection communicating with the upper portion of said tank, a second base, an upstanding frame carried by said second base, a second casing carried by said second base and enclosing said frame, an upstanding water vessel carried by the lower portion of said frame, a fluid conduit arranged in good heat exchange relation with said vessel, a first detachable water conduit communicating between the lower portion of said tank and the lower portion of said vessel, a second detachable water conduit communicating between the upper portion of said tank and the upper portion of said vessel, said first and second detachable water conduits accommodating ready connection and disconnection of said tank and said vessel with respect to each other, a refrigerant compressor carried by the intermediate portion of said frame, means for operating said compressor, means for conducting compressed superheated gaseous refrigerant from said compressor into the upper portion of said fluid conduit and for conducting subcooled liquid refrigerant from the lower portion of said fluid conduit to effect heating of the water in said vessel in order to cause the water to rise therein so as to induce a thermo-siphon circulation of the water from the lower portion of said tank via said first water conduit into the lower portion of said vessel and from the upper portion of said vessel via said second water conduit into the upper portion of said tank, the upper portion of said fluid conduit constituting a refrigerant desuperheating region and the intermediate portion of said fluid conduit constituting a refrigerant condensing region and the lower portion of said fluid conduit constituting a refrigerant subcooling region, a refrigerant evaporator carried by the upper portion of said frame, means for expanding the subcooled liquid refrigerant conducted from the lower portion of said fluid conduit in said evaporator, means for conducting the expanded gaseous refrigerant from said evaporator back into said compressor, means for circulating air into and out of the upper portion of said second casing and into heat-exchange relation with said evaporator, a valve arranged in said second water conduit and selectively operable to control the passage therethrough of the water from the upper portion of said vessel into the upper portion of said tank, and thermal responsive means for selectively operating said valve.

13. A water heater comprising a first base, an upstanding hot water storage tank carried by said first base, a first casing carried by said first base and enclosing said tank, a cold water inlet connection communicating with the lower portion of said tank, a hot water outlet connection communicating with the upper portion of said tank, a second base, an upstanding frame carried by said second base, a second casing carried by said second base and enclosing said frame, an upstanding water vessel carried by the lower portion of said frame, a fluid conduit arranged in good heat exchange relation with said vessel, a first detachable water conduit communicating between the lower portion of said tank and the lower portion of said vessel, a second detachable water conduit communicating between the upper portion of said tank and the upper portion of said vessel, said first and second detachable water conduits accommodating ready connection and disconnection of said tank and said vessel with respect to each other, a refrigerant compressor carried by the intermediate portion of said frame, means for operating said compressor, means for conducting compressed superheated gaseous refrigerant from said compressor into the upper portion of said fluid conduit and for conducting subcooled liquid refrigerant from the lower portion of said fluid conduit to effect heating of the water in said vessel in order to cause the water to rise therein so as to induce a thermo-siphon circulation of the water from the lower portion of said tank via said first water conduit into the lower portion of said vessel and from the upper portion of said vessel via said second water conduit into the upper portion of said tank, the upper portion of said fluid conduit constituting a refrigerant desuperheating region and the intermediate portion of said fluid conduit constituting a refrigerant condensing region and the lower portion of said fluid conduit constituting a refrigerant subcooling region, a refrigerant evaporator carried by the upper portion of said frame, means for expanding the subcooled liquid refrigerant conducted from the lower portion of said fluid conduit in said evaporator, means for conducting the expanded gaseous refrigerant from said evaporator back into said compressor, said second casing having first and second openings formed in the upper portion thereof, means including a fan carried by the upper portion of said frame for circulating air through said first and second openings and into heat exchange relation with said evaporator, means including a drip pan carried by the upper portion of said frame and disposed below said evaporator for catching condensate from said evaporator that is condensed from the air circulated in heat exchange relation therewith, means including a drain conduit communicating with said drip pan for conducting the condensate to the exterior, a valve arranged in said second water conduit and selectively operable to control the passage therethrough of the water from the upper portion of said vessel into the upper portion of said tank, and thermal responsive means for selectively operating said valve.

14. In a room cooling system including a room, a refrigerant evaporator, and means for circulating air from one part of said room into heat exchange relation with said evaporator and thence back into another part of said room; the combination comprising an upstanding water vessel, a fluid conduit arranged in good heat exchange relation with said vessel, a refrigerant compressor, means responsive to the temperature of the air in said room for selectively operating said compressor, means for conducting compressed superheated gaseous refrigerant from said compressor into the upper portion of said fluid conduit and for conducting subcooled liquid refrigerant from the lower portion of said fluid conduit and for expanding the subcooled liquid refrigerant in said evaporator and for conducting expanded gaseous refrigerant from said evaporator back into said compressor, the upper portion of said fluid conduit constituting a refrigerant desuperheating region and the intermediate portion of said fluid conduit constituting a refrigerant condensing region and the lower portion of said fluid conduit constituting a refrigerant subcooling region, an upstanding water storage tank, a cold water inlet connection communicating with the lower portion of said tank, a hot water drain conduit communicating with the upper portion of said tank, a first water conduit communicating between the lower portion of said tank and the lower portion of said vessel, a second water conduit communicating between the upper portion of said tank and the upper portion of said vessel, the water in said vessel being heated by said fluid conduit in order to cause the water to rise therein so as to induce a thermo-siphon circulation of the water from the lower portion of said tank via said first water conduit into the lower portion of said vessel and from the upper portion of said vessel via said second water conduit into the upper portion of said tank, a first valve arranged in said second water conduit and selectively operable to control the passage therethrough of the water from the upper portion of said vessel into the upper portion of said tank, means responsive to the temperature of the water in said second water conduit for selectively operating said first valve, a second valve arranged in said hot water drain conduit and selectively operable to control the escape of hot water from the upper portion of said tank, and means responsive to the temperature of the water in the lower portion of said tank for selectively operating said second valve.

15. In a room cooling system including a room, a refrigerant evaporator, means for circulating air from one part of said room into heat exchange relation with said evaporator and thence back into another part of said room, a refrigerant compressor, means responsive to the temperature of the air in said room for selectively operating said compressor, a refrigerant condenser, and means for conducting compressed gaseous refrigerant from said compressor to said condenser and for conducting liquid refrigerant from said condenser and for expanding the liquid refrigerant in said evaporator and for conducting the expanded gaseous refrigerant from said evaporator back into said compressor; the combination comprising an upstanding water storage tank, a cold water inlet connection communicating with the lower portion of said tank; a hot water drain conduit communicating with the upper portion of said tank, means including said condenser for heating the water in said tank so that the temperature of the stored water is progressively raised from the upper portion toward the lower portion of said tank, a valve arranged in said hot water drain conduit and selectively operable between closed and open positions to control the escape of hot water from the upper portion of said tank, and means including a thermal device responsive to temperatures of the water in the lower portion of said tank respectively disposed somewhat above and somewhat below a given temperature for respectively operating said valve into its open and closed positions.

16. In a room cooling system including a room, a refrigerant evaporator, means for circulating air from one part of said room into heat exchange relation with said evaporator and thence back into another part of said room, a refrigerant compressor, means including a room thermostat responsive to the temperature of the air in said room for selectively operating said compressor, a refrigerant condenser, and means for conducting compressed gaseous refrigerant from said compressor to said condenser and for conducting liquid refrigerant from said condenser and for expanding the liquid refrigerant in said evaporator and for conducting the expanded gaseous refrigerant from said evaporator back into said compressor; the combination comprising an upstanding water storage tank, a cold water inlet connection communicating with the lower portion of said tank, a hot water drain conduit communicating with the upper portion of said tank, means including said condenser for heating the water in said tank so that the temperature of the stored water is progressively raised from the upper portion toward the lower portion of said tank, a valve arranged in said hot water drain conduit and selectively operable to control the escape of hot water from the upper portion of said tank, a tank thermostat responsive to the temperature of the water in the lower portion of said tank, and means governed jointly by said room thermostat and by said tank thermostat for selectively operating said valve.

17. In a room cooling system including a room, a room thermostat responsive to the temperature of the air in said room and operable between hot and cold positions, a refrigerant compressor, an electric motor for operating said compressor, means responsive to operation of said room thermostat into its respective hot and cold positions for respectively starting and stopping operation of said motor, a refrigerant evaporator, means for circulating air from one part of said room into heat exchange relation with said evaporator and thence back into another part of said room, a refrigerant condenser, and means for conducting compressed gaseous refrigerant from said compressor to said condenser and for conducting liquid refrigerant from said condenser and for expanding the liquid refrigerant in said evaporator and for conducting the expanded gaseous refrigerant from said evaporator back into said compressor; the combination comprising an upstanding water storage tank, a cold water inlet connection communicating with the lower portion of said tank, a hot water drain conduit communicating with the upper portion of said tank, means including said condenser for heating the water in said tank so that the temperature of the stored water is progressively raised from the upper portion toward the lower portion of said tank, a valve arranged in said hot water drain conduit and selectively operable between closed and open positions to control the escape of hot water from the upper portion of said tank, a tank thermostat responsive to the temperature of the water in the lower portion of said tank and operable between hot and cold positions, and means governed both by operation of said room thermostat into its hot position and by operation of said tank thermostat into its hot position for operating said valve into its open position and governed either by operation of said room thermostat into its cold position or by operation of said tank thermostat into its cold position for operating said valve into its closed position.

18. In a combination water heating and room cooling system including an upstanding hot water storage tank, a cold water inlet connection communicating with the lower portion of said tank, a hot water outlet connection and a drain conduit communicating with the upper portion of said tank, a room, a refrigerant evaporator, means for circulating air from one part of said room into heat exchange relation with said evaporator and thence back into another part of said room, a refrigerant compressor, an electric motor for operating said compressor, a refrigerant condenser, means including said condenser for heating the water in said tank so that the temperature of the stored water is progressively raised from the upper portion toward the lower portion of said tank, and means for conducting compressed gaseous refrigerant from said compressor to said condenser and for conducting liquid refrigerant from said condenser and for expanding the liquid refrigerant in said evaporator and for conducting the expanded gaseous refrigerant from said evaporator back into said compressor; the combination comprising a room thermostat responsive to the temperature of the air in said room and operable between hot and cold positions, a tank thermostat responsive to the temperature of the water in the lower portion of said tank and operable between hot and cold positions, a first circuit for operating said motor, means responsive to operation of said room thermostat into its hot position for completing said first circuit, additional means responsive to operation of said tank thermostat into its cold position for completing said first circuit, a valve arranged in said drain conduit and operable from a normally closed position into an open position to control the escape of hot water from the upper portion of said tank, and means governed both by operation of said room thermostat into its hot position and by operation of said tank thermostat into its hot position for operating said valve.

19. In a combination water heating and room cooling system including an upstanding hot water storage tank, a cold water inlet connection communicating with the lower portion of said tank, a hot water outlet connection and a drain conduit communicating with the upper portion of said tank, a room, a refrigerant evaporator, means for circulating air from one part of said room into heat exchange relation with said evaporator and thence back into another part of said room, a refrigerant compressor, an electric motor for operating said compressor, a refrigerant condenser, means including said condenser for heating the water in said tank so that the temperature of the stored water is progressively raised from the upper portion toward the lower portion of said tank, and means for conducting compressed gaseous refrigerant from said compressor to said condenser and for conducting liquid refrigerant from said condenser and for expanding the liquid refrigerant in said evaporator and for conducting the expanded gaseous refrigerant from said evaporator back into said compressor; the combination comprising a room thermostat responsive to the temperature of the air in said room and operable between hot and cold positions, a tank thermostat responsive to the temperature of the water in the lower portion of said tank and operable between hot and cold positions, a first circuit for operating said motor, means responsive to operation of said room thermostat into its hot position for completing said first circuit, additional means responsive to operation of said tank thermostat into its cold position for completing said first circuit, an electromagnetic valve arranged in said drain conduit and operable from a normally closed position into an open position to control the escape of hot water from the upper portion of said tank, a second circuit for operating said valve, and means responsive jointly to operation of said room thermostat into its hot position and to operation of said tank thermostat into its hot position for completing said second circuit.

20. In a combination water heating and room cooling system including an upstanding hot water storage tank, a cold water inlet connection communicating with the lower portion of said tank, a hot water outlet connection and a drain conduit communicating with the upper portion of said tank, a room, a refrigerant evaporator, means for circulating air from one part of said room into heat exchange relation with said evaporator and thence back into another part of said room, a refrigerant compressor, an electric motor for operating said compressor, a refrigerant condenser, means including said condenser for heating the water in said tank so that the temperature of the stored water is progressively raised from the upper portion toward the lower portion of said tank, and means for conducting compressed gaseous refrigerant from said compressor to said condenser and for conducting liquid refrigerant from said condenser and for expanding the liquid refrigerant in said evaporator and for conducting the expanded gaseous refrigerant from said evaporator back into said compressor; the combination comprising a room thermostat responsive to the temperature of the air in said room and operable between hot and cold positions, a tank thermostat responsive to the temperature of the water in the lower portion of said tank and operable between hot and cold positions, a first circuit for operating said motor, means responsive to operation of said room thermostat into its hot position for completing said first circuit, additional means responsive to operation of said tank thermostat into its cold position for completing said first circuit, a relay, additional means responsive to operation of said room thermostat into its hot position for operating said relay, an electromagnetic valve arranged in said drain conduit and operable from a normally closed position into an open position to control the escape of hot water from the upper portion of said tank, a second circuit for operating said valve, and means responsive jointly to operation of said relay and to operation of said tank thermostat into its hot position for completing said second circuit.

21. In a combination water heating and room cooling system including an upstanding hot water storage tank, a cold water inlet connection communicating with the lower portion of said tank, a hot water outlet connection and a drain conduit communicating with the upper portion of said tank, a room, a refrigerant evaporator, means for circulating air from one part of said room into heat exchange relation with said evaporator and thence back into another part of said room, a refrigerant compressor, an electric motor for operating said compressor, a refrigerant condenser, means including said condenser for heating the water in said tank so that the temperature of the stored water is progressively raised from the upper portion toward the lower portion of said tank, and means for conducting compressed gaseous refrigerant from said compressor to said condenser and for conducting liquid refrigerant from said condenser and for expanding the liquid refrigerant in said evaporator and for conducting expanded gaseous refrigerant from said evaporator back into said compressor; the combination comprising structure defining an upstanding chamber arranged in good heat exchange relation with said condenser, a first water conduit communicating between the lower portion of said tank and the lower portion of said chamber, a second water conduit communicating between the upper portion of said tank and the upper portion of said chamber, said condenser heating the water in said chamber in order to cause it to rise therein so as to induce a thermosiphon circulation of the water from the lower portion of said tank via said first water conduit into the lower portion of said chamber and from the upper portion of said chamber via said second water conduit into the upper portion of said tank, a first valve arranged in said second water conduit and selectively operable to control the passage therethrough of the water from the upper portion of said chamber into the upper portion of said tank, means responsive to the temperature of the water in said second water conduit for selectively operating said first valve, a room thermostat responsive to the temperature of the air in said room and operable between hot and cold positions, a tank thermostat responsive to the temperature of the water in the lower portion of said tank and operable between hot and cold positions, a first circuit for operating said motor, means responsive to operation of said room thermostat into its hot position for completing said first circuit, additional means responsive to operation of said tank thermostat into its cold position for completing said first circuit, a second valve arranged in said drain conduit and operable from a normally closed position into an open position to control the escape of hot water from the upper portion of said tank, and means governed both by operation of said room thermostat into its hot position and by operation of said tank thermostat into its hot position for operating said second valve.

22. The method of heating water in a storage tank to a predetermined storage temperature comprising withdrawing cold water from the lower portion of said tank, heating said withdrawn cold water to a temperature somewhat above said predetermined storage temperature, returning said hot water to the upper portion of said tank to complete the water cycle, and arresting said water cycle when the temperature of the water in the lower portion of said tank is elevated to a temperature somewhat below said predetermined storage temperature.

23. The method of heating water in a storage tank to a predetermined storage temperature comprising transferring heat from the atmosphere to a refrigerant evaporator by circulating the atmosphere into heat exchange relation with said evaporator, transferring heat from said evaporator to a refrigerator condenser by circulating a refrigerant therebetween in a compression-liquefaction-expansion cycle so that the temperature of said evaporator is maintained below the ambient temperature of the atmosphere and the temperature of said condenser is maintained above said predetermined storage temperature, withdrawing cold water from the lower portion of said tank, passing said withdrawn cold water into heat exchange relation with said condenser so that the temperature thereof is elevated somewhat above said predetermined storage temperature, returning said hot water to the upper portion of said tank to complete the water cycle, and arresting said water cycle when the temperature of the water in the lower portion of said tank is elevated to a temperature somewhat below said predetermined storage temperature.

24. The method of cooling a room to a given temperature comprising withdrawing warm air from one part of said room, passing said withdrawn warm air into heat exchange relation with a refrigerant evaporator, returning said cool air back to another part of said room to complete the air cycle, arresting said air cycle when the temperature of said room is lowered to said given temperature, transferring heat from said evaporator to a refrigerant condenser by circulating a refrigerant therebetween in a compression-liquefaction-expansion cycle so that the temperature of said evaporator is maintained below said given temperature and the temperature of said condenser is maintained above a predetermined temperature of approximately 150° F., withdrawing cold water from the lower portion of an upstanding storage tank, passing said withdrawn cold water into heat exchange relation with said condenser so that the temperature thereof is elevated somewhat above said predetermined storage temperature, returning said hot water to the upper portion of said tank to complete the water cycle, initiating the discharge of hot water from the upper portion of said tank to a drain when the temperature of the water in the lower portion of said tank is elevated to a temperature approaching said predetermined temperature, supplying sufficient cold water to the lower portion of said tank to maintain said tank substantially full of water, and arresting the discharge of hot water from the upper portion of said tank to said drain when the temperature of the water in the lower portion of said tank is lowered to a temperature well below said predetermined temperature.

25. The method of cooling a room to a given temperature and of heating water in a storage tank to a predetermined storage temperature comprising withdrawing warm air from one part of said room, passing said withdrawn air into heat exchange relation with a refrigerant evaporator, returning said cool air back to another part of said room to complete the air cycle, circulating a refrigerant in a compression-liquefaction-expansion cycle between said evaporator and a refrigerant condenser so that the temperature of said evaporator is maintained below said given temperature and the temperature of said condenser is maintained above said predetermined temperature, withdrawing cold water from the lower portion of an upstanding storage tank, passing said withdrawn cold water into heat exchange relation with said condenser so that the temperature thereof is elevated somewhat above said predetermined storage temperature, returning said hot water to the upper portion of said tank to complete the water cycle, initiating the discharge of hot water from the upper portion of said tank to a drain when the temperature of the water in the lower portion of said tank is elevated to a control temperature disposed somewhat below said predetermined temperature prior to lowering of the temperature of said room to said given temperature, supplying sufficient cold water to the lower portion of said tank to maintain said tank substantially full of water, arresting the discharge of hot water from the upper portion of said tank to said drain when the temperature of the water in the lower portion of said tank is lowered to a temperature well below said predetermined temperature, and arresting said refrigerant cycle when both the temperature of said room is lowered at least to said given temperature and the temperature of the water in the lower portion of said tank is elevated to said control temperature.

26. In a heat pump system of the compression-liquefaction-expansion cycle type including a compressor and a condenser and an evaporator arranged in a closed refrigerant circuit; the combination comprising a hot water storage tank, a cold water inlet connection communicating with the lower portion of said tank, a hot water outlet connection communicating with the upper portion of said tank, means responsive to the temperature of the water in the lower portion of said tank for selectively operating said compressor, a vessel arranged in good heat exchange relation with said condenser, means for circulating water from the lower portion of said tank through said vessel and thence back into the upper portion of said tank in order to heat the water in said tank progressively from the upper portion thereof toward the lower portion thereof, and means responsive to the temperature of the water circulated from said vessel back into the upper portion of said tank for selectively controlling the rate of said circulation.

27. In a heat pump system of the compression-liquefaction-expansion cycle type including a compressor and a condenser and an evaporator arranged in a closed refrigerant circuit; the combination comprising a room, means for circulating air from one part of said room through said evaporator and thence back into another part of said room in order to cool the air in said room, means responsive to the temperature of the air in said room for selectively operating said compressor, a hot water storage tank, a cold water inlet connection communicating with the lower portion of said tank, a hot water outlet connection communicating with the upper portion of said tank, a vessel arranged in good heat exchange relation with said condenser, means for circulating water from the lower portion of said tank through said vessel and thence back into the upper portion of said tank in order to heat the water in said tank progressively from the upper portion thereof toward the lower portion thereof, a drain conduit, and means responsive to the temperature of the water in the lower portion of said tank for selectively controlling the discharge of hot water from said hot water outlet connection into said drain conduit.

KEMPER M. HAMMELL.

References Cited in the file of this patent

UNITED STATES PATENTS

| Number | Name | Date |
|---|---|---|
| 1,331,600 | Wales | Feb. 24, 1920 |
| 1,786,861 | Miller | Dec. 30, 1930 |
| 1,937,288 | McGraw | Nov. 28, 1933 |
| 1,969,187 | Schutt | Aug. 7, 1934 |
| 2,095,017 | Wilkes | Oct. 5, 1937 |
| 2,126,266 | Laird | Aug. 9, 1938 |
| 2,297,970 | Merz | Oct. 6, 1942 |
| 2,375,157 | Wilkes | May 1, 1945 |
| 2,441,885 | Kemler | May 18, 1948 |
| 2,513,373 | Sporn | July 4, 1950 |
| 2,516,094 | Ruff | July 18, 1950 |
| 2,520,535 | Ewald | Aug. 29, 1950 |
| 2,575,325 | Ambrose | Nov. 20, 1951 |
| 2,632,306 | Ruff | Mar. 24, 1953 |